United States Patent [19]

Parker, III et al.

[11] Patent Number: 5,306,793

[45] Date of Patent: Apr. 26, 1994

[54] EMULSION POLYMERIZATION METHOD UTILIZING MALEIC ANHYDRIDE PROPYLENE SULFONATE ADDUCTS AS POLYMERIZABLE EMULSIFIERS

[75] Inventors: Julian E. Parker, III, James Island; John A. Alford, Goose Creek, both of S.C.

[73] Assignee: Westvaco Corporation, New York, N.Y.

[21] Appl. No.: 948,632

[22] Filed: Sep. 23, 1992

[51] Int. Cl.⁵ .............................. C08F 2/26
[52] U.S. Cl. .................... 526/213; 526/216
[58] Field of Search ............... 526/213, 216

[56] References Cited

U.S. PATENT DOCUMENTS

| | | |
|---|---|---|
| 2,300,056 | 12/1938 | Meis et al. . |
| 3,219,608 | 11/1965 | Ingleby ............... 526/214 |
| 3,876,689 | 4/1975 | Meyers et al. . |
| 3,907,870 | 9/1975 | Kozuka et al. . |
| 3,980,622 | 9/1976 | Kozuka et al. . |
| 4,259,459 | 3/1981 | Force . |
| 4,544,726 | 10/1985 | Alford et al. . |

FOREIGN PATENT DOCUMENTS 30285  3/1976  Japan .

OTHER PUBLICATIONS

J. W. Wilson et al., "Soap Ingredients as Retarders in Butadiene-Styrene Copolymerization," Industrial and Engineering Chemistry, Mar. 1948, pp. 530-534.

S. M. Ahmed et al., "Cleaning Latexes for Surface Characterization by Serum Replacement," Journal of Coloid and Interface Science, vol. 73, No. 2, Feb. 1980, pp. 388-405.

Primary Examiner—Christopher Henderson
Attorney, Agent, or Firm—Daniel B. Reece, IV; Terry B. McDaniel; Richard L. Schmalz

[57] ABSTRACT

The invention relates to polymerizable emulsifiers, methods of preparing the emulsifiers, and latex compositions comprising the emulsifiers. In particular, the invention relates to maleic anhydride propylene sulfonate adducts of rosin and/or fatty acid which can be substituted for the surfactants or emulsifiers traditionally employed in the preparation of butadiene derived latexes.

3 Claims, No Drawings

EMULSION POLYMERIZATION METHOD UTILIZING MALEIC ANHYDRIDE PROPYLENE SULFONATE ADDUCTS AS POLYMERIZABLE EMULSIFIERS

FIELD OF THE INVENTION

The invention relates to polymerizable emulsifiers, methods of preparing the emulsifiers, and latex compositions comprising the emulsifiers. In particular, the invention relates to maleic anhydride propylene sulfonate adducts of rosin and/or fatty acid which can be substituted for the surfactants or emulsifiers traditionally employed in the preparation of butadiene derived latexes.

BACKGROUND OF THE INVENTION

Emulsion polymerization is one of several methods for effecting the process of addition polymerization. In emulsion polymerization the monomer is emulsified in a medium (generally water) with the aid of an emulsifying agent, surfactant, or micelle generating substance (such as rosin, fatty acids, soaps, alkyl sulfonates, etc). In addition to the monomer, emulsifier, and water (as the continuous phase), the process also requires an initiator. Hydrogen peroxide and ammonium peroxysulfonate are examples of such initiators.

One of the principal advantages of emulsion polymerization is the possibility of formation of a polymer of high molecular weight at a very high rate of polymerization. In this respect emulsion polymerization stands alone among techniques of free radical polymerization. Thus, this process has gained widespread commercial acceptance.

In U.S. Pat. No. 2,300,056, Meis and Ludwig developed emulsifiers for emulsion polymerization from mixtures of (a) water soluble surface active emulsifying agents and (b) water soluble salts of unsaturated carboxylic acids, the esters of which represent drying oils (particularly alkali metal salts).

In commonly assigned U.S. Pat. No. 4,259,459, Force disclosed acid-catalyzed, formaldehyde-treated mixtures of tall oil fatty and resin acids as emulsion polymerization emulsifiers. Also, in *Emulsion Polymerization, Theory and Practice* (1975), at Chapter 7, Blackley discusses the use of various fatty acid soaps and rosin acid soaps as micelle generating substances. Of considerable concern, however, is the effect upon polymerization which may be caused by adventitious impurities in the fatty acid or rosin acid soap used, particularly soaps derived from unsaturated fatty acids. Wilson et al. reported in *Industrial Engineering Chemistry* (1948), Vol. 40, p. 530, that soaps derived from linoleic and linolenic acids retard the copolymerization of styrene and butadiene. Naturally, the emulsifier also should not disturb the physical properties of the polymer.

Another major concern for producers and consumers of polymer products is the migration of emulsifier from the polymer. In some cases the result is merely a visual or aesthetic problem, while in other cases the result can be more dramatic (as with hoses for gasoline and other fuels). For those end uses where migration of emulsifier is of concern, two approaches can be taken to minimize problems: (1) washing the emulsifier from the latex before further converting operations or (2) polymerizing the emulsifier into the polymer so that the emulsifier is permanently bound.

Although commonly used, the first approach results in increased costs due to the additional required operational steps. The second approach is less commonly employed because such emulsifiers typically are very expensive and have limited scope primarily due to low polymerization activity.

In U.S. Pat. Nos. 3,907,870 and 3,980,622 Kozuka et al. disclose polymerizable emulsifying agents having the formula;

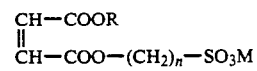

wherein R is an alkyl group having 6 to 22 carbon atoms, M is H, Li, Na, K, or $NH_4$, and n is an integer of 2 to 4, inclusive.

In commonly assigned U.S. Pat. No. 4,544,726, Alford, a co-inventor in this application, disclosed half vinyl esters of $C_{21}$-dicarboxylic acid as emulsion polymerization emulsifiers. Although excellent emulsifiers, the half vinyl esters exhibited some stability problems under certain conditions.

An object of the present invention, therefore, is to provide a novel latex composition from which, upon polymerization, the emulsion polymerization emulsifier will not migrate. A further object of this invention is to provide a polymerizable emulsifier for use in an emulsion polymerization process which, upon polymerization, will be permanently bound. Also, an object of this invention is to provide an emulsifier which neither inhibits polymerization nor adversely affects the polymer physical properties.

SUMMARY OF THE INVENTION

These objectives are achieved by producing maleic anhydride propylene sulfonate adducts of rosin and/or fatty acid which can be utilized as polymerizable emulsifiers in the preparation of butadiene derived latexes. By employing these emulsifiers one can obtain the following improvements: (1) a synthetic rubber in which the emulsifier is chemically bound to the polymer and does not migrate or exude from the finished product, (2) a more easily coagulated latex, and (3) cleaner, less contaminated wastewater.

Latex manufacturers have desired a polymerizable emulsifier of this type for many years. However, most of the previously developed materials required such high use levels that they substantially changed the properties of the resulting Polymer. As a result these materials have, in effect, been relegated to use as comonomers (e.g., sodium vinyl sulfonate, sodium, 2-sulfoethylmethacrylate, etc.). To avoid this problem the applicants' emulsifiers are capable of being polymerized into the backbone of the polymer at the levels of normal surfactant use (thereby not significantly changing the properties of the resulting latexes).

DESCRIPTION OF THE PREFERRED EMBODIMENT

The maleic anhydride propylene sulfonate adducts of rosin and/or fatty acid which can be utilized as polymerizable emulsifiers are represented by Chemical Structure 1 below:

CHEMICAL STRUCTURE 1

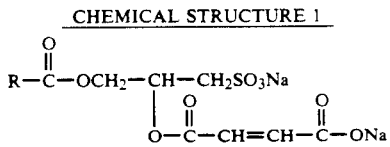

where R equals rosin or fatty acid.

Methods for producing these polymerizable emulsifiers are shown in the reaction schemes below. Reaction Scheme I involves the addition reaction of a salt (sodium bisulfite) with epichlorohydrin to give the chlorohydroxy propane sulfonate. This product is condensed with the requisite rosin soap and/or fatty acid soap to yield the hydroxy propane sulfonate ester. The ester is subsequently condensed with maleic anhydride to produce the emulsifying adduct product. Alternatively, the products can be prepared by Scheme II in which the first two reaction steps are reversed from Scheme I. Reaction Scheme I is preferred, as it results in both purer products and higher yields.

REACTION SCHEME I

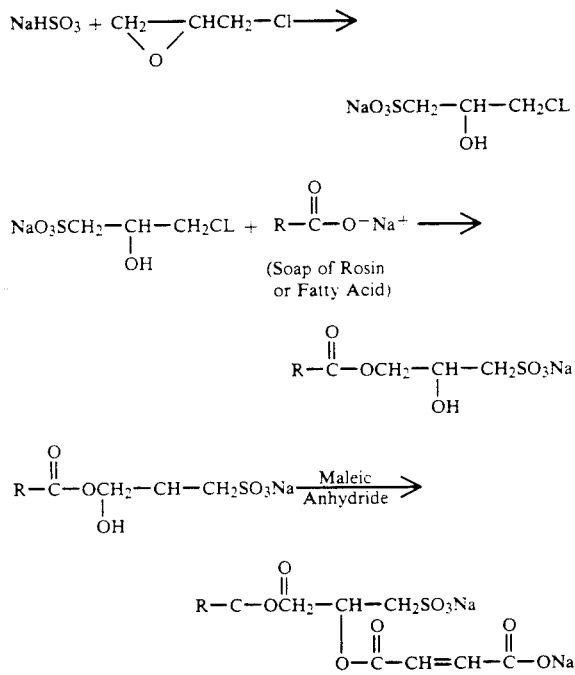

(R = Rosin or fatty acid.)

REACTION SCHEME II

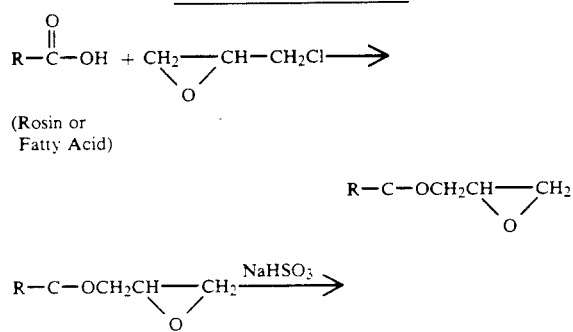

-continued
REACTION SCHEME II

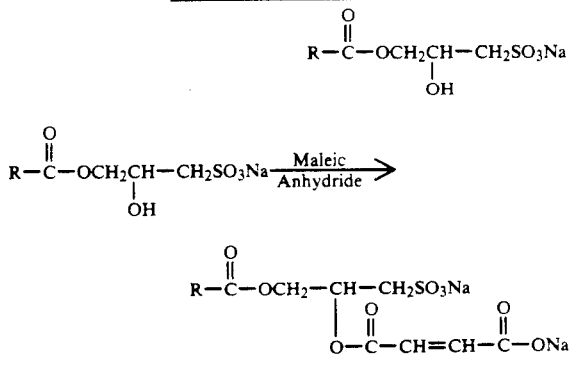

(R = Rosin or fatty acid.)

Salts which are suitable for use in the reaction to produce the polymerizable emulsfier include, but are not limited to, the following:
ammonium bisulfite,
calcium bisulfite,
potassium bisulfite,
sodium bisulfite, and
combinations thereof.

Any saturated fatty acid or mono-olefinic fatty acid containing carbons in the range of $C_{12}$-$C_{20}$ is suitable for use in the reaction. Likewise, any stabilized or unstabilized rosin is suitable for use in the reaction. Sources of suitable rosin include tall oil rosin, gum rosin, and wood rosin.

Monomers which are suitable for use with the emulsifier include, but are not limited to, the following:
acrylic,
methacrylic,
acrylonitrile,
butadiene,
chloroprene,
styrene, and
combinations thereof.

The following examples are provided to further illustrate the present invention and are not to be construed as limiting the invention in any manner.

EXAMPLE 1

A 1000 ml beaker was charged with 135.21 g (0.4621 moles) of WESTVACO ® 1480 (a tall oil based disproportionated fatty acid manufactured by Westvaco, Inc.) and 355 ml of ethanol (200 proof). The mixture was stirred via a magnetic stir bar until the fatty acid was in solution. To the solution was added 18.78 g (0.4621 moles) of NaOH in 100 ml of water. The mixture was again stirred and transferred to a Parr reactor equipped with a stirrer. To the mixture was added 99.92 g (.5083 moles) of 3-chloro-2-hydroxy-l-propane sulfonic acid, Na salt hydrate. The Parr reactor was sealed and the mixture heated to 140° C., where the mixture was allowed to react, with stirring, for six hours. At the end of this period the reaction was cooled to 48° C. and the stirring was stopped.

The Parr reactor was opened and the solution was poured into a 1000 ml flask. The ethanol was subsequently removed via a roto evaporator, and the separated material was poured into a 3-neck 1000 ml flask equipped with a thermometer and adopter, a 24/40 stopper, and a Dean Stark trap with condenser. (Any material left in the 1000 ml flask was dissolved into some toluene and the toluene solution poured into the 3-neck flask.) Toluene was added to the material in the 3-neck flask and the mixture was heated until the material went into solution (leaving behind the insoluble salt). The salt was separated from the material by vacuum filtration and the water was removed from the material by azeotroping with toluene using a Dean Stark trap with condenser. After removing the water, the toluene was removed on the roto-evaporator, leaving a fatty acid sulfonated product weighing 200.21 g.

To a 500 ml round bottom flask was charged 179.30 g (0.3952 moles) of the above sulfonated product and 180 ml of toluene. The mixture was refluxed and stirred with a magnetic stirrer until the rosin sulfonate product was in solution. At this time 1.00 g of 0.45% paratoluene sulfonic acid and 38.75 g (0.3952 moles) of pulverized maleic anhydride were added to the mixture. The reaction was heated to reflux (about 115° C.) and allowed to proceed (with stirring) for 7 hours. At this time approximately 80 ml of the toluene was stripped off (via a roto-evaporator) and an additional 0.72 g of paratoluene sulfonic acid was added. The refluxing was continued for an additional 2 hours. At this time the remaining toluene was stripped off leaving a residue weight of 219.62 g.

Approximately 150 ml of water was added to the 500 ml round bottom flask and heated in a heating mantle to make the material fluid enough to pour into a 1000 ml beaker. An additional 100 ml of water was added to the flask and heated until all of the material could be transferred from the flask into the beaker. At this time 33.48 g of 50% NAOH (which had been diluted to about 15%) was slowly added to the beaker (with stirring) over a period of 30 minutes. The product adduct solution (hereafter referred to as PE #1) was determined to have a pH of 5.51 and a solids level of 28.29%.

EXAMPLE 2

A 1000 ml beaker was charged with 132.12 g (0.4308 moles) of WESTVACO ® ROSIN 82 (a tall oil based disproportionated rosin acid manufactured by Westvaco, Inc.) and 355 ml of ethanol (200 proof). The mixture was stirred via a magnetic stir bar until the rosin acid was in solution. To the solution was added 17.51 g (0.4308 moles) of NAOH in 100 ml of water. The mixture was again stirred and transferred to a Parr reactor equipped with a stirrer. To the mixture was added 99.92 g (.5083 moles) of 3-chloro-2-hydroxy-1-propane sulfonic acid, Na salt hydrate. The Parr reactor was sealed and the mixture heated to 140° C., where the mixture was allowed to react, with stirring, for six hours. At the end of this period the reaction was cooled to 48° C., the stirrer was stopped, and the material was allowed to sit for 30 minutes. The Parr reactor was opened and the solution was poured way from the insoluble salts into a 500 ml round bottom flask. The ethanol was subsequently removed via a roto-evaporator (leaving enough ethanol to make the solution fluid), and the separated material was poured into a 3-neck 1000 ml flask equipped with a thermometer and adopter, a 24/40 stopper, and a Dean Stark trap with condenser. (Any material left in the 500 ml flask was dissolved into some toluene and the toluene solution poured into the 3-neck flask.). After the water had been removed by azeotroping with toluene, the toluene was removed via the roto-evaporator, leaving a rosin sulfonated product weighing 168.04 g.

To a 500 ml round bottom flask was charged 168.04 g of the above sulfonated product and 300 ml of toluene. The mixture was refluxed and stirred with a magnetic stirrer until the fatty acid sulfonated product was in solution. At this time 0.67 g of 0.4% paratoluene sulfonic acid and 35.20 g (0.3592 moles) of pulverized maleic anhydride were added to the mixture. The reaction was heated to reflux (about 110° C.) and allowed to proceed (with stirring) for 8 hours. At this time approximately 200 ml of the toluene was stripped off, and an additional 0.67 g of paratoluene sulfonic acid was added. The temperature was increased to 130° C., and the refluxing continued for an additional 5 hours. At this time the remaining toluene was stripped off via a roto-evaporator leaving a residue weight of 100.01 g.

Approximately 100 ml of water was added to the 500 ml round bottom flask and the mixture was stirred with a magnetic stir bar. Subsequently, the solution was transferred from the flask into a 600 ml beaker. At this time 14.20 g of 50% NAOH (which had been diluted to about 15%) was slowly added to the beaker (with stirring) over a period of 30 minutes while heating on a hot plate. The product adduct solution (hereafter referred to as PE #2) was determined to have a pH of 6.51 and a solids level of 27.62%.

EXAMPLE 3

Styrene-butadiene polymerizations were performed using the products of the synthesis of Examples 1 and 2 (PE #1 and PE #2) and a standard emulsifier for comparison purposes. (The polymerization formulation is given below in parts by weight.) The resulting styrene butadiene rubber (SBR) latexes were evaluated for particle diameter and attachment of the emulsifier to the particles. The volume-average particle diameters of the latexes are shown in Table I.

| SBR FORMULATION | |
|---|---|
| Butadiene | 76.0000 |
| Styrene | 24.0000 |
| Water | 200.0000 |
| Emulsifier[1] | 4.3500 |
| Potassium Chloride[2] | 0.4000 |
| TAMOL N[3] | 0.1500 |
| Sulfole | 0.2500 |
| Ferrous Hepto Sulfate | 0.1200 |
| VERSENE 100[4] | 0.0326 |
| Sulfoxylate | 0.0335 |
| p-menthane hydroperoxide | 0.0650 |

[1]PE #1, PE #2, and a control (ROSIN 82) were evaluated.
[2]The KCL electrolyte is in the formulation to increase the solids at which a latex can be made without becoming too thick to handle due to the secondary electroviscous effect. However, the KCl is known to cause some colloidal instability. Therefore, a second set of polymerizations were carried out omitting the KCl from the formulations. The results of both polymerization sets are listed in Table 1 below.
[3]TAMOL N is a napthlene sulfonate manufactured by Rohm and Haas, Inc.
[4]VERSENE 100 is a sodium ethylene diamine tetraacetic acid manufactured by Dow Chemicals, Inc.

TABLE I

| Volume-Average Particle Diameter Comparison of Latexes | | | |
|---|---|---|---|
| | Particle Diameter (nm) | | |
| | Peak 1 | % Volume | Peak 2 | % Volume |
|---|---|---|---|---|
| ROSIN 82 Control | 43.7 | 100.0 | — | — |
| PE #1 w/KCl | 63.2 | 96.1 | 257.5 | 3.9 |
| PE #1 w/o KCl | 61.8 | 98.1 | 312.4 | 1.9 |
| PE #2 w/KCl | 62.3 | 94.4 | 186.9 | 5.6 |
| PE #2 w/o KCl | 55.2 | 97.5 | 215.4 | 2.5 |

These polymerizable emulsifiers produced excellent latexes 30% larger in particle diameter than traditional rosin or fatty acid emulsifiers. This explains why the latexes did not become viscous when KCl was left out of the recipe. The smaller the diameter of a latex the lower the solids at which it will become viscous due to the secondary electroviscous effect. As a rule of thumb, when electrolyte is present, 50 nm latex gels at 36% solids, 100 nm latex at 42% solids, and 200 nm latex at 50% solids. Therefore, the secondary electroviscous effect would occur at a solids level closer to the 42% solids for 100 nm particle diameter than the 33% solids at which these bottles were prepared.

Another difference observed was that the latexes prepared with the polymerizable emulsifiers all had a small quantity of quite large particles in them. However, this bimodal distribution should not be detrimental to the latex.

A serum replacement procedure was used to show that PE #1 and PE #2 polymerized into the polymer backbone. (This common procedure is discussed in the article "Cleaning Latexes for Surface Characterization by Serum Replacement," *Journal of Colloid and Interface Science*, Vol 73, No. 2, p. 388–405, (Feb. 1980) by S.M. Ahmed et al.) In this study, the two latexes made without the KCl electrolyte were evaluated. A ten-gram latex sample was diluted to 90 g with distilled water containing enough potassium hydroxide to increase its PH to 10.6. At this pH, both the sulfonate and carboxyl groups are fully ionized.

The dilute latex was placed into an enclosed filter funnel equipped with a magnetic stirrer and 100 nm pore size nucleopore filter. The serum was replaced through the filter with the PH 10.6 water until about 500 ml of clear serum and water was collected. The pH 10.6 water, siphoned from about five feet above the sealed funnel, entered at the same rate as the serum left through the filter so the latex concentration in the funnel remained constant.

Surface tension is a simple quantitative method of determining small concentrations of surfactant in water. The average tension of the ~500 ml of replaced serum from the PE #1 (fatty acid) adduct was 70.3 dynes/cm. The replaced serum (~50 ml) of the PE #2 (rosin) adduct had an average surface tension of 73.6 dynes/cm. From calibration curves for these polymerizable emulsifiers, these surface tensions are equal to $2.58 \times 10^{-3}$ g/l for the fatty acid adduct and $2.94 \times 10^{-3}$ g/l for the rosin adduct.

These latexes contained 14.5 g/l of emulsifier. Thus, the 10 g of latex upon which the serum replacements were performed had 0.145 g emulsifier associated with it. Since about 500 ml of pH 10.4 water and serum was accumulated from each serum replacement funnel, the potential concentration of emulsifier could be 0.29 g/l (0.145 g/500 ml×2). The surface tensions obtained corresponded only to about 1/100 of this amount. Therefore, it can be concluded that these emulsifiers polymerized nearly quantitatively into the backbone.

It is possible that other ingredients may have passed through the filter (such as the polymerized naphthalene sulfonate Secondary emulsifier) which might be responsible for the very small decreases in surface tension observed in the replaced serum. This would make polymerization into the backbone even more quantitative.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. In an emulsion polymerization process comprising combining a monomer selected from the group consisting of acrylic, methacrylic, acrylonitrile, butadiene, chloroprene, styrene, and combinations thereof, emulsifier, initiator, and water as the continuous phase, the improvement wherein the emulsifier is a maleic anhydride propylene sulfonate adduct of the general formula

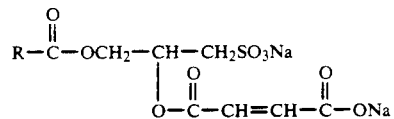

wherein R is a member selected from the group consisting of stabilized rosins, unstabilized rosins, saturated fatty acids containing carbons in the range of $C_{12}$–$C_{20}$, mono-olefinic fatty acids containing carbons in the range of $C_{12}$–$C_{20}$, and combinations thereof.

2. The process of claim 1 wherein the fatty acids are derived from tall oil.

3. The process of claim 1 wherein the rosins are derived from tall oil.

* * * * *